United States Patent [19]

Stewart

[11] 3,842,353

[45] Oct. 15, 1974

[54] PHOTOELECTRIC TRANSDUCER
[75] Inventor: David John Stewart, Wokingham, England
[73] Assignee: National Research Development Corporation, London, England
[22] Filed: Feb. 23, 1973
[21] Appl. No.: 335,111

[52] U.S. Cl............ 324/109, 73/398 R, 250/231 R, 250/231 P
[51] Int. Cl....... G01d 5/34, G01l 9/00, G01r 29/22
[58] Field of Search......... 250/231, 231 P; 324/109; 73/398 R

[56] References Cited
UNITED STATES PATENTS
2,567,253   9/1951   Strange et al........................ 324/109
3,705,308   12/1972  Lehovec........................... 250/231 R FOREIGN PATENTS OR APPLICATIONS
1,006,475   10/1965  Great Britain..................... 324/109

Primary Examiner—James W. Lawrence
Assistant Examiner—T. N. Grigsby
Attorney, Agent, or Firm—Cushman, Darby & Cushman

[57] ABSTRACT

This invention concerns an optical servo balance with a wide range of applications. It can for example be used as a microphone, a voltage comparator or a manometer. The position of a membrane or pellicle is detected optically so as to derive an electrical signal proportional to the displacement and this signal is used in a negative feed-back circuit to generate an electrostatic force driving the membrane towards its null position in opposition to the displacing force. The optical detection means can take a number of forms and can for example have either interferometric or focus sensitive means.

20 Claims, 5 Drawing Figures

PHOTOELECTRIC TRANSDUCER

The present invention concerns an electro-optical device suitable for a wide range of applications. In particular the invention is concerned with an electro-optical device which can detect and measure forces and pressure differences. The forces may be electrostatic and accordingly the device finds application as a voltage comparator. Alternatively the device, when measuring pressure differences, can be used as a microphone or a manometer.

According to one aspect of the present invention there is provided an electro-optical device comprising a membrane, electro-optical means for producing an output signal in response to movement of the membrane from its null position, and electrostatic means for driving the membrane towards its null position in response to a negative feed-back signal proportional to said output signal.

Various embodiments of electro-optical devices will now be described by way of example and with reference to the accompanying drawings, in which.

Figure 1:
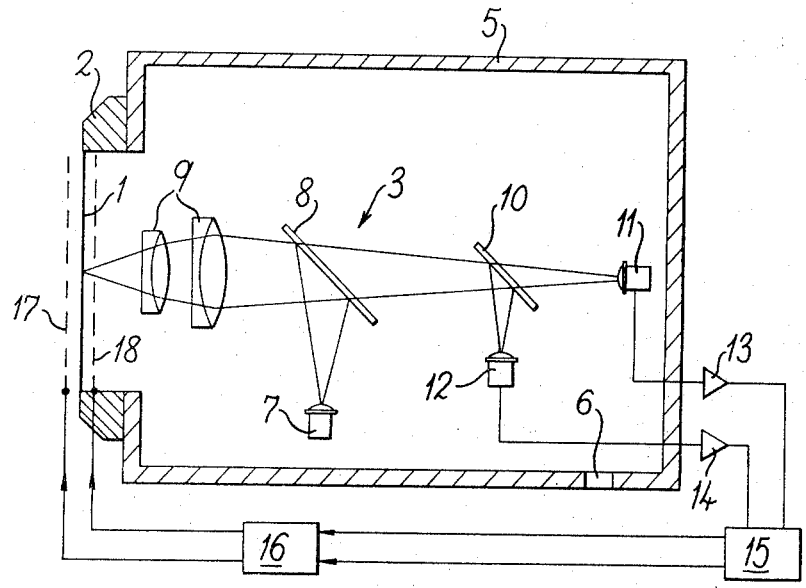
FIG. 1 is a diagrammatic section of a microphone constructed in accordance with the present invention.

The microphone shown in FIG. 1 contains the three basic integers which are common to all electro-optical devices embodying the present invention.

The first of these three integers is a thin flexible pellicle or membrane 1 mounted on a rigid former 2. The pellicle is made from or is coated with, an electrically conductive material. Thus it may be made from nitro-cellulose, some microns thick which has been vacuum coated to provide the necessary electrical conductivity and optical reflectivity. The former 2 can be of ceramics, plastics or a stable metal.

The second integer is an electro-optical sensing system generally indicated at 3. This system detects displacement of the centre of the membrane 1 under applied forces and produces an output signal the sign and magnitude of which are dependent upon the direction and degree of displacement.

The third integer is an electrostatic system acting on the membrane in response to the output signal from the sensing system 3 to apply a restoring force to the membrane 1 to return it to its null position in opposition to the deflecting force. Thus the sensing system in effect generates a negative feed-back signal of high gain.

In the embodiment of FIG. 1 the deflecting forces are acoustic waves. The device is mounted with a casing 5 to isolate one side of the membrane 1 from the acoustic waves. The casing 5 is also provided with a bleed vent 6 to equalise the pressure within the casing.

The electro-optical sensing system comprises a solid state radiation source 7 generating a beam of radiation which after reflection by a beam splitter 8 is focussed by a suitable lens system 9 on to the centre point of the membrane 1. As the membrane 1 is optically reflective the reflected radiation is re-imaged by the lens system 9 on to a further beam splitter 10. A pair of solid state photo-detectors 11 and 12 are positioned so that detector 11 receives the radiation reflected from the beam splitter 10 and detector 12 the radiation transmitted. These photodetectors are axially displaced one on either side of the image plane. Thus as the membrane 1 oscillates in response to the acoustic waves the outputs of the photodetectors 11 and 12 will be modulated at the oscillation frequency but with 180° phase difference.

The outputs of the photo-detectors are taken via pre-amplifiers 13, 14 to suitable phase sensitive detection means 15 and via gain control circuitry 16 to a pair of electrostatic electrodes 17, 18 mounted symmetrically one on either side of the membrane 1 so as to generate on these electrodes an electrostatic force driving the membrane 1 towards its original force null position.

The devices thus act as a balanced servo system tending to return the membrane 1 to its null position and the varying negative feed-back signal required to maintain this null position is of course dependent on the acoustic waves impinging on the membrane 1. Thus by separately amplifying this feed-back signal by amplifier 19 an output signal is obtained suitable for driving a loudspeaker or recording equipment.

Figure 2:
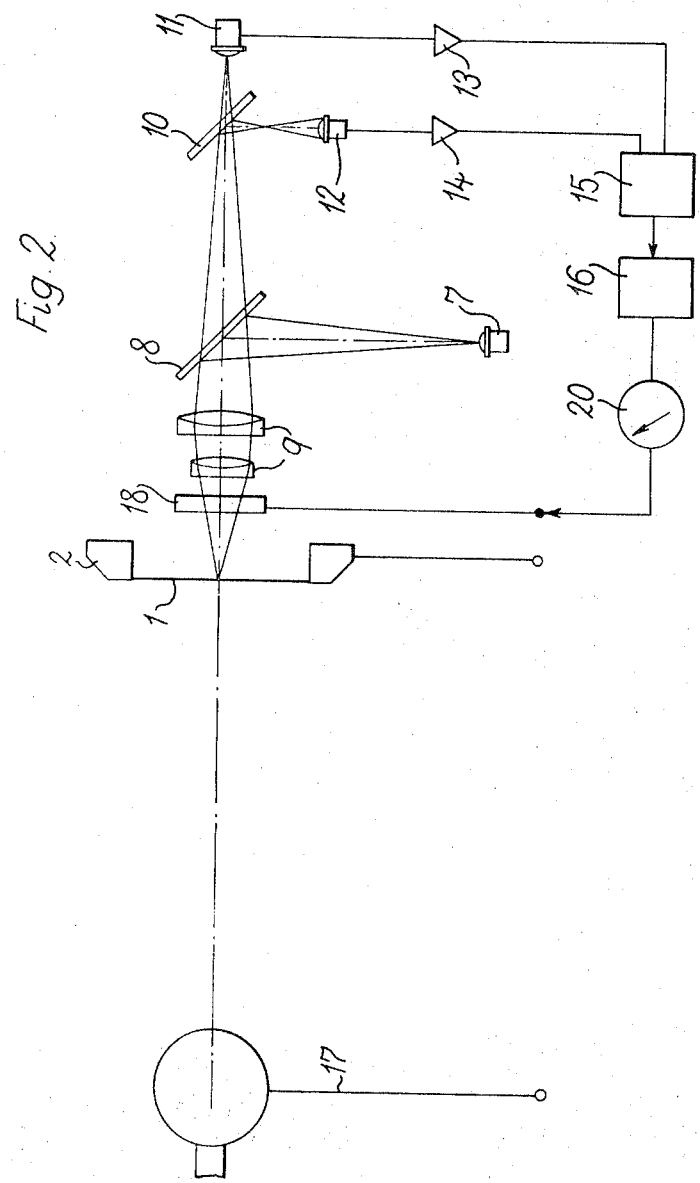
FIG. 2 is a similar view of a voltage comparator constructed in accordance with the present invention.

The voltage comparator shown in FIG. 2 of the accompanying drawings has the same optical sensing system and many other integers in common with the microphone of FIG. 1. Thus similar integers will be given the same reference numerals.

However, in the voltage comparator the electrode 17 is mounted substantially further away from the membrane 1 than the electrode 18. When in use an unknown voltage to be measured is applied to the electrode 17 deflecting the membrane 1 from its null position. As previously the movement of the membrane 1 is detected by the sensing system causing a negative feed-back signal to be applied to the electrode 18 of a sign and a magnitude sufficient to restore the membrane 1 to its null position by counteracting the electrostatic force generated by the unknown voltage. The compensating voltage required can then be measured by a conventional voltmeter 20.

Let it be assumed that the ratio of the distance between electrodes 17 and 18 with respect to membrane 1 is 10 to 1. It will be understood that the force between an electrode and the membrane depends upon the square of the voltage between them and that the forces are in the sense of attraction, irrespective of the sign of the voltage. This square law is a sufficient approximation for the purpose of the present description. In real terms the dimensions of the system and the effective voltage ratio are connected by a more complex relationship, but the principle holds. Thus in the present system an unknown voltage of 100 V. would give rise to a compensating voltage of + or − 1 volt. This factor does not detract from the value of the device in real situations as fluctuations in the unknown high voltage are not so large as to reverse their polarity with respect to earth.

It is to be noted that the device could be used in a series of similar stages with the compensating voltage of the first stage being applied as the high voltage of the second stage. For two stages similar to the one described with both brought to the null balance condition, the overall ratio between the original unknown voltage and the final compensating voltage would be 10,000 to 1.

The compensating voltage might be applied under manual control for so-called Direct-Current measurement, or automatically in response to the output of the sensing system under Alternating Current conditions.

Figure 3:
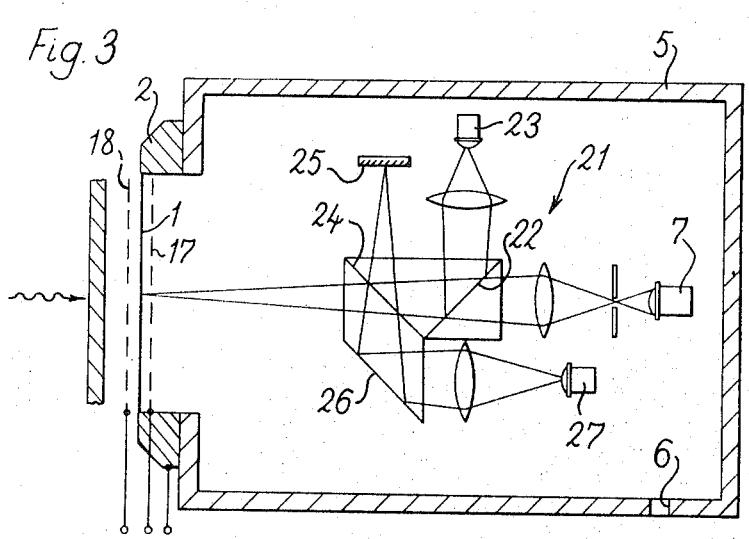
FIG. 3 is a similar view of a second embodiment of a microphone.

FIG. 3 shows a second embodiment of a microphone which differs from the embodiment of FIG. 1 in that an interferometric optical sensing system is used to sense changes in the position of the membrane and to generate the negative feed-back signal. In this embodiment radiation from the source 7 is directed via an optical system generally indicated at 21 so that the radiation is focussed on to the membrane 1 and reflected from the pellicle membrane 1 via a beam splitter 22 on to a photo-detector 23 to provide a main beam length, and is also reflected via a beam splitter 24 on to a reference mirror 25 and thereafter reflected via a mirror 26 on to a photo-detector 27 to provide a reference beam length. Thus as the position of the membrane 1 is varied by acoustic waves signals of differing phases are generated by the photo-detectors 23, 27 and as previously used to generate a negative feed-back signal for restoring the membrane 1 to its null position and which can also be amplified to provide the required output signal.

Naturally the same optical sensing system could be applied to the voltage comparator described previously with reference to FIG. 2.

Figure 4:
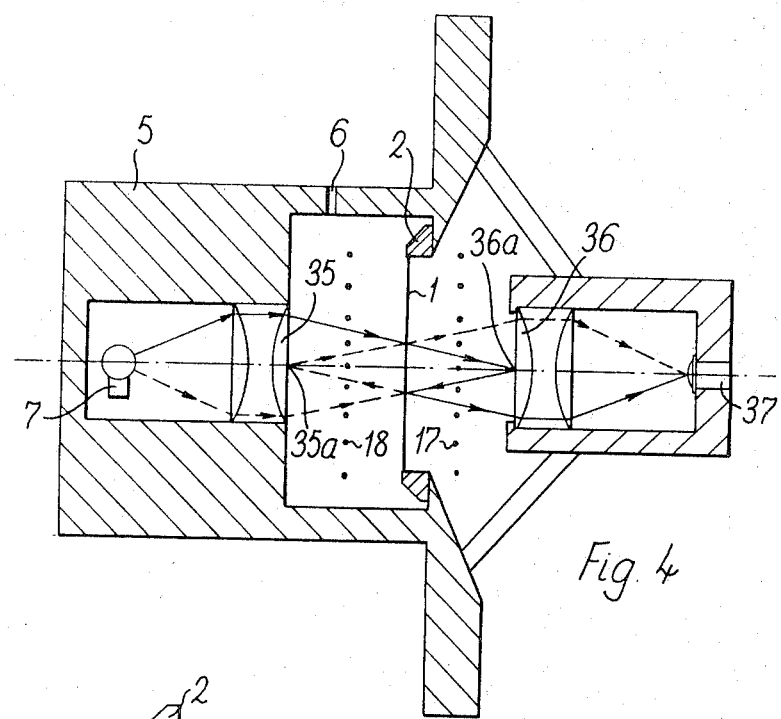
FIG. 4 is a balanced interferometer.
Figure 5:
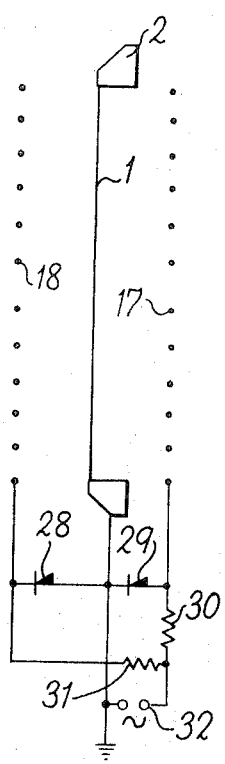
FIG. 5 is a circuit for imparting the oscillation to the membrane of FIG. 4.

The embodiment shown in FIG. 4 is a balanced interferometer including as in the other embodiments a membrane 1, radiation source 7, electrostatic guides 17, 18 and a negative feed-back system for maintaining the membrane 1 in its null position. In this embodiment an oscillation is imparted to the membrane 1 having an amplitude of less than ¼ wavelength of the radiation source. This oscillation can be imparted by a circuit such as that shown in FIG. 5 having a pair of semiconductor diodes 28, 29 and resistors 30, 31. When a sinusoidal voltage is connected between terminal 32 and earth the diodes 28, 29 will conduct alternately in accordance with the sign of the driving voltage causing oscillation of the membrane 1 at the sinusoidal voltage frequency. The movement so produced is arranged so as to be adequate for modulation but insufficient to disturb the working of the interferometer. In the embodiment being described 33 and 34 are optical systems including plane parallel faces 35, 36 with each face having at its centre a fully reflecting portion 35a, 36a. A single photo-detector 37 and a solid state broad spectrum radiation source 7 are arranged to be optically conjugate by the paths shown in full and dotted lines in FIG. 4. If the distances between face 35 and the membrane 1 and the face 36 and the membrane 1 are precisely equal there will be a zero path difference for light of all wavelengths and propagated in both directions. Hence at that setting a single achromatic interference fringe will cover the photo-detector 37.

When considering the electro-optic system according to the present invention it will be noted that a salient point in the operation of the device is that the path difference is maintained close to zero. This is a most important and beneficial result, in that radiation sources of high coherence are not required. Coherent radiation is provided by continuous lasers or by systems comprising a source exhibiting a single line spectrum together with condensing optics and a small aperture. Such systems are large, fragile and expensive. The maintenance of effectively zero path difference permits the use of solid state lamps and in some cases incandescent sources which are cheap, small and rugged.

Now consider the situation when the membrane 1 is oscillated by the sinusoidal voltage applied to the terminal 32. In such a case the output of the photo-detector 37 will also be a sinusoid but at twice the drive frequency and having a mean value of zero. If the membrane 1 is now displaced by an additional force, for example a variation in pressure, the detector output will contain a component at the fundamental frequency of the exciting waveform. The phase of the fundamental waveform changes by 180° when the sign of the displacement changes. The purpose of the electronic circuitry is to select the fundamental by low pan filtering, and to reduce the mean amplitude of the fundamental to zero by reducing the membrane excursions to zero. It will be appreciated that the signal discussed above is a sinusoidal wave which is amplitude modulated by the magnitude of the membrane movement and which is phase modulated between 0° – 180° by the sign of the membrane movement. It is thus necessary to convert the signal to one which is demodulated, that is, a signal which corresponds in magnitude and sign to the membrane and displacement. Means for carrying out this operation, such as phase sensitive detectors or synchronous rectifiers, are well known in the art.

However, in the present embodiment a novel and particularly simple method will be described.

Let the detector 37 be one which requires an electrical bias voltage for its operation, and which is electrically reversible. Examples are photo-resistive detectors or dual diode detectors.

Let the bias voltage be a sinusoid of the same waveform as the drive oscillating the membrane 1. The output signal (current) from the detector 37 will now be the required waveform, representing in magnitude and sign the displacement of the membrane 1. The parameters of the system may not permit this arrangement, but if they do it provides a particularly simple and cheap solution.

It is to be noted particularly that this system using an impressed oscillatory motion of the membrane 1 enables phase sensitive detection of membrane displacement whilst using only a single detector.

Thus in the embodiment described with reference to FIG. 1 one of the two photo-detectors could be replaced together with the beam splitter.

Returning to the present embodiment the resultant signal is applied after suitable amplification at 38 to provide negative feed-back to return the membrane 1 to its null position. Clearly the interferometer described with reference to FIG. 4 can be used as a microphone, or as an absolute or a differential manometer. Alternatively it can be used as a sensor of the axial position of either surface 35 or 36 or as a sensor of changes in the refractive index in the spaces on either side of the membrane 1.

The mode of action of the device in the case of manometric applications is particularly advantageous in that the force due to the control feed-back potential which is applied to the electrostatic electrodes is constrained to balance the force due to pressure change. Since the unit operates close to its optimum geometry whilst the forces remain balanced extensions of the measuring range by large factors can be expected.

Naturally the means for providing the sinusoidal oscillation of the membrane 1 can take many forms other than that described with reference to FIG. 4. For example oscillators actuated by piezo-electric or magnetostrictive effects may be used.

In all the embodiments described hereinbefore it is of course possible to have a standing bias or polarising voltage between the membranes and electrodes thus enabling repulsive forces to be stimulated between the membrane and the or each electrode.

Furthermore in all the embodiments described hereinbefore alternative optical sensing systems may be employed to sense displacements of the membrane 1 from its null position.

Thus systems may be used which are based upon sensing the changes in the spatial distribution of radiation reflected from the membrane 1 as it is distorted.

Alternatively a system may be employed in which distortion of the membrane causes a displacement of an image irradiance distribution with respect to an object of similar shape to the image. If the object and the image are identical and periodic this class of system produces so-called Moire fringes.

Another system is that in which distortion of an optical wavefront reflected from the membrane 1 is sensed by techniques such as Schlieren shadow-graph or phase contrast methods.

A still further system is one in which the membrane, which need not be of optical quality, is placed in juxtaposition with a hologram record of itself, so that on distortion of the membrane a system of interference fringes is created which can be detected photo-electrically.

In any of these systems phase detection using impressed oscillations on the membrane and a single photo-detector may be employed.

In all embodiments of the invention there will be need for frequency dependent circuits for the compensation of phase-shifts and for the attenuation of gain in accordance with the established laws of servo-system design.

Potential advantages of the devices described hereinbefore with reference to the accompanying drawings are numerous and include high sensitivity and speed of response, large dynamic range and versatility of application. In particular because of the use of negative feed-back to maintain the membrane as close as is possible to its null position the dynamic range is not limited by the physical characteristics of the membrane itself.

I claim:

1. An electro-optical device comprising an electrically conductive and optically reflective membrane; a source of radiation; a pair of detectors; a lens system for focussing the radiation and for imaging the focussed radiation onto said pair of detectors, said pair of detectors being displaced with reference to one another on either side of the image plane of the focussed radiation; a beam splitter for splitting the imaged radiation reflected by said membrane onto said pair of detectors, so that movement of the membrane creates output signals from said detectors which differ in phase; electrical means for deriving from the outputs of the pair of detectors an electrical signal the sign of which is dependent on the direction of displacement of said membrane and the magnitude of which is dependent on the amount of displacement; and at least one electrostatic electrode mounted adjacent to said membrane for driving the membrane toward its null position in response to a negative feedback signal proportional to said electrical signal.

2. An electro-optical device comprising an electrically conductive and optically reflective membrane; a source of radiation; at least one detector; a lens system for focussing the radiation and for imaging the focussed radiation onto said at least one detector; electrical means for deriving from the at least one detector output an electrical signal the sign of which is dependent on the direction of displacement of said membrane and the magnitude of which is dependent on the amount of displacement; at least one electro-static electrode mounted adjacent to said membrane for driving the membrane toward its null position in response to a negative feedback signal proportional to said electrical signal derived from said detector output, and wherein the electro-optical device is utilized as a voltage comparator and including an additional electrostatic electrode mounted adjacent said membrane on its side opposite said one electrostatic electrode with an unknown voltage to be measured applied to said second electrostatic electrode to produce displacement of said membrane.

3. An electro-optical device comprising an electrically conductive and optically reflective membrane; a source of radiation; a lens system for focussing the radiation onto said membrane; means for impressing on said membrane a sinusoidal wave form at a predetermined frequency for a displacement of approximately one quarter of a wave length of the raidation from said source; phase sensitive means for deriving from said detector a signal, the amplitude and sign of which are dependent on the direction and amplitude of movement respectively of the membrane under an additional force; and at least one electrostatic electrode mounted adjacent to said membrane for driving said membrane towards its null position in response to a negative feed-back signal proportional to the output signal derived by said phase sensitive means.

4. A device as claimed in claim 3 wherein said detector has a bias voltage for its operation, and wherein said phase sensitive means comprises means for varying the bias to said detector with a sinusoidal wave form of the same frequency and phase as the wave form impressing oscillations on said membrane.

5. An electro-optical device in accordance with claim 3 and utilized as a microphone for acoustic energy and wherein one side of said electrically conductive and optically reflective membrane is exposed to the acoustic energy and displaced thereby.

6. An electro-optical device in accordance with claim 3 and utilized as a manometer for measuring pressure, and wherein one side of said electrically conductive and optically reflective membrane is exposed to the pressure being measured to cause a displacement thereof.

7. An electro-optical device in accordance with claim 3 and utilized as a voltage comparator and including an additional electrostatic electrode mounted adjacent said membrane on its side opposite said one electrostatic electrode with an unknown voltage to be measured applied to said second electrostatic electrode to produce displacement of said membrane.

8. An electro-optical device comprising an electrically conductive and optically reflective membrane; a source of radiation; an interferometric system, including first and second detectors and a reference mirror for focussing radiation from said source along one path onto said membrane and from membrane onto said first detectors so as to provide a first path length, and for focussing radiation from said source along a second path to said reference mirror and from said reference mirror onto said second detector so as to provide a second path length whereby displacement of said membrane from its null position causes said detectors to provide output signals which differ in phase; and an electrostatic means for driving the membrane towards its null position in response to a negative feed-back signal derived from said detector output signals.

9. A device as claimed in claim 8 and comprising phase sensitive means for deriving from the detector output signals an electrical signal the sign of which is dependent on the direction of displacement of the membrane, and the magnitude of which is dependent upon the amount of displacement of said membrane, and means for applying said electrical signal to said electrostatic means to oppose the force displacing said membrane.

10. An electro-optical device in accordance with claim 8 and utilized as a microphone for acoustic energy and wherein one side of said electrically conductive and optically reflective membrane is exposed to the acoustic energy and displaced thereby.

11. An electro-optical device in accordance with claim 8 and utilized as a manometer for measuring pressure, and wherein one side of said electrically conductive and optically reflective membrane is exposed to the pressure being measured to cause a displacement thereof.

12. An electro-optical device in accordance with claim 8 and utilized as a voltage comparator and including an additional electrostatic electrode disposed on one side of said membrane opposite said electrostatic means, with the unknown voltage to be measured applied to said additional electrostatic electrode for displacing said membrane.

13. An electro-optical device comprising an electrically conductive and partially optically reflective membrane, a source of radiation mounted on one side of said membrane; a detector mounted equidistant on the other side of said membrane; a lens system on either side of said membrane, each lens system having a centrally fully reflective region; the lens system providing optically conjugate paths on either side of said membrane so that displacement of the membrane causes a variation in the output of said detector; and an electrostatic means for driving the said membrane towards its null position in response to a negative feed-back signal derived from said detector output signal.

14. An electro-optical device in accordance with claim 13 and utilized as a manometer for measuring pressure, and wherein one side of said electrically conductive and optically reflective membrane is exposed to the pressure being measured to cause a displacement thereof.

15. An electro-optical device in accordance with claim 13 and utilized as a manometer for measuring pressure, and wherein one side of said electrically conductive and optically reflective membrane is exposed to the pressure being measured to cause a displacement thereof.

16. An electro-optical device in accordance with claim 13 and utilized as a voltage comparator and including an additional electrostatic means disposed on a side of said membrane opposite said electrostatic means, with an unknown voltage applied to said additional electrostatic means.

17. A device as claimed in claim 13 and including means for oscillating said membrane at a predetermined frequency for a displacement of approximately a quarter of the wave length of the radiation from said source.

18. A device as claimed in claim 17 and including a filter for removing from the detector output signal the modulation imparted by said oscillation at the predetermined frequency so that the resultant signal has, after processing in said phase sensitive means, a magnitude and sign dependent on any additional force causing displacement of said membrane.

19. A device as claimed in claim 18 and including means for applying said resultant signal to said electrostatic means so as to oppose the force causing the displacement of said membrane.

20. A device as claimed in claim 19 wherein the electrostatic means comprises a pair of electrodes mounted one on either side of said membrane.

* * * * *

UNITED STATES PATENT OFFICE
CERTIFICATE OF CORRECTION

Patent No. 3,842,353      Dated October 15, 1974

Inventor(s) David John Stewart

It is certified that error appears in the above-identified patent and that said Letters Patent are hereby corrected as shown below:

<u>In the heading</u>:

Please add:

--[30] Foreign Application Priority Data

February 24, 1972    Great Britain...... 8501/72
    October 26, 1972    Great Britain.....49379/72
    November 24, 1972    Great Britain.....54351/72

Signed and sealed this 18th day of February 1975.

(SEAL)
Attest:

RUTH C. MASON
Attesting Officer

C. MARSHALL DANN
Commissioner of Patents
and Trademarks